M. LEHMER.
Heating Stove.
No. 89,670. Patented May 4, 1869.
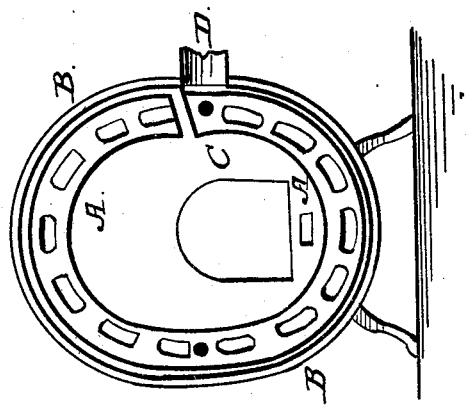
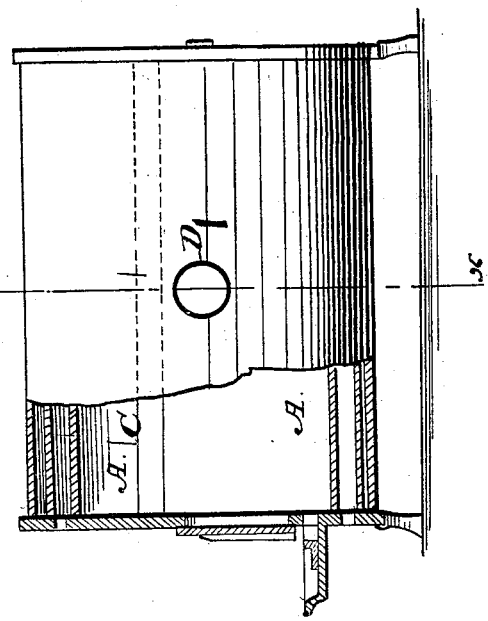
Witnesses
John F. Brooks
C. Greene Collyns
Inventor
M. Lehmer
Munn & Co.
attys

United States Patent Office.

MICHAEL LEHMER, OF OREGON, MISSOURI.

Letters Patent No. 89,670, dated May 4, 1869.

COAL-STOVE.

The Schedule referred to in these Letters Patent and making part of the same.

*To all whom it may concern:*

Be it known that I, MICHAEL LEHMER, of Oregon, in the county of Holt, and State of Missouri, have invented a new and improved Heater; and I do hereby declare that the following is a full, clear, and exact description thereof, which will enable others skilled in the art to make and use the same, reference being had to the accompanying drawings, forming part of this specification, in which—

Figure 1 is a side view of my improved heater, part being broken away to show the construction.

Figure 2 is a vertical cross-section of the same, taken through the line $x\ x$, fig. 1.

Similar letters of reference indicate corresponding parts.

My invention has for its object to furnish an improved heater, which shall be so constructed and arranged as to furnish a large amount of heating-surface, so as to utilize all the heat from the products of combustion before they pass off into the chimney; and It consists in the construction of the heater, as hereinafter more fully described.

A is the fire-box, which is made in the shape of an oval horizontal cylinder, as shown in figs. 1 and 2. One end of the fire-box is closed with an end-plate, and in the other end-plate is formed the door.

B is a double-walled drum, which is made in the same shape as the fire-box A, and which surrounds the said fire-box at a short distance from it. The ends of the double-walled drum B are attached to the projecting edges of the end-plates of the fire-box A, the parts of said end-plates between the fire-box A and drum B being made with numerous holes or openings through them, or in the form of lattice, or other open-work, so as to permit a free circulation of air between the said fire-box and drum, said air being thus brought in contact with a very large amount of heating-surface.

In the side of the fire-box A, and in the inner wall of the drum B, are formed openings, which I prefer to make narrow, and extending the whole length of the said fire-box and drum, which said openings are connected with each other, so as to form a passage, C, for the products of combustion from the fire-box A to the interior of the drum B.

The products of combustion, after entering the drum B through the passage C, pass entirely around said drum, and escape into the chimney through the egress-pipe D, the part of the interior of the drum B, with which the passage C is connected, being separated from the part with which the egress-pipe D is connected, by a partition, so as to prevent the products of combustion from passing directly into the egress-pipe D.

By this construction a very large amount of heating-surface is supplied, so that the heat is almost entirely withdrawn from the products of combustion before they escape into the chimney.

It should be observed that the position of the egress-pipe D, and consequently of the passage C, is entirely immaterial. The said pipe may be placed at the top of the heater, if desired or more convenient.

Having thus described my invention,

I claim as new, and desire to secure by Letters Patent—

An improved heater, formed by the combination of the fire-box A and drum B with each other, substantially in the manner herein shown and described, that is to say, in such a manner that a space may be left between the said fire-box and drum, for the free circulation of the air, as and for the purpose set forth.

MICHAEL LEHMER.

Witnesses:
JAMES SCOTT,
LEVI ZOOK.